United States Patent [19]

Paull et al.

[11] 4,178,758
[45] Dec. 18, 1979

[54] PARTIAL OXIDATION PROCESS

[75] Inventors: Peter L. Paull, Weston, Conn.; Rodney McGann, Santa Cruz, Calif.

[73] Assignee: Texaco Inc., White Plains, N.Y.

[21] Appl. No.: 956,135

[22] Filed: Oct. 30, 1978

Related U.S. Application Data

[60] Division of Ser. No. 855,645, Nov. 29, 1977, which is a continuation-in-part of Ser. No. 698,439, Jun. 21, 1976, Pat. No. 4,099,382.

[51] Int. Cl.$^2$ .................................... F01K 27/00
[52] U.S. Cl. ............................ 60/648; 60/670; 48/197 R; 48/215; 252/373; 165/134 R; 60/39.12
[58] Field of Search ............... 48/197 R, 215; 60/39.12, 648, 670, 655; 252/373; 165/134

[56] References Cited

U.S. PATENT DOCUMENTS

| | | | |
|---|---|---|---|
| 2,593,963 | 4/1952 | Biggs | 60/655 |
| 3,002,347 | 10/1961 | Sprague | 60/39.12 |
| 3,400,754 | 9/1968 | Barbu et al. | 165/134 X |
| 3,866,411 | 2/1975 | Marion et al. | 60/39.12 X |
| 4,099,382 | 7/1978 | Paull et al. | 60/648 |

Primary Examiner—Allen M. Ostrager
Assistant Examiner—Stephen F. Husar
Attorney, Agent, or Firm—Thomas H. Whaley; Carl G. Ries; Albert Brent

[57] ABSTRACT

Sensible heat in the hot effluent gas stream leaving a partial oxidation gas generator for the production of raw synthesis gas, reducing gas, or fuel gas is used at its maximum temperature to produce a continuous stream of superheated steam at a pressure which may exceed the pressure in the gas generator. The by-product superheated steam may be used as a dispersant or carrier of the fuel feed to the generator or as a temperature moderator. Optionally, a portion of the by-product superheated steam may be used as the working fluid in a turbine to produce mechanical work or electrical energy or both. The high steam superheat temperature results in a higher conversion efficiency. A shell and tube heat exchanger in which a stream of steam or cleaned generator gas is continuously bled from inside the tubes to the outside, or the reverse is employed. The bleed stream mixes with the effluent gas stream passing through the heat exchanger. By this means a continuously flowing protective sheath or curtain of comparatively cooler bleedstream is placed between the surfaces of the tubes and headers, if any, in the heat exchanger and the surrounding hot effluent gas stream from the gas generator, which enters the heat exchanger at maximum temperature. The surfaces of the tubes and headers, if any, are thereby protected against corrosive gas attack and deposits of ash, slag, and soot.

46 Claims, 2 Drawing Figures

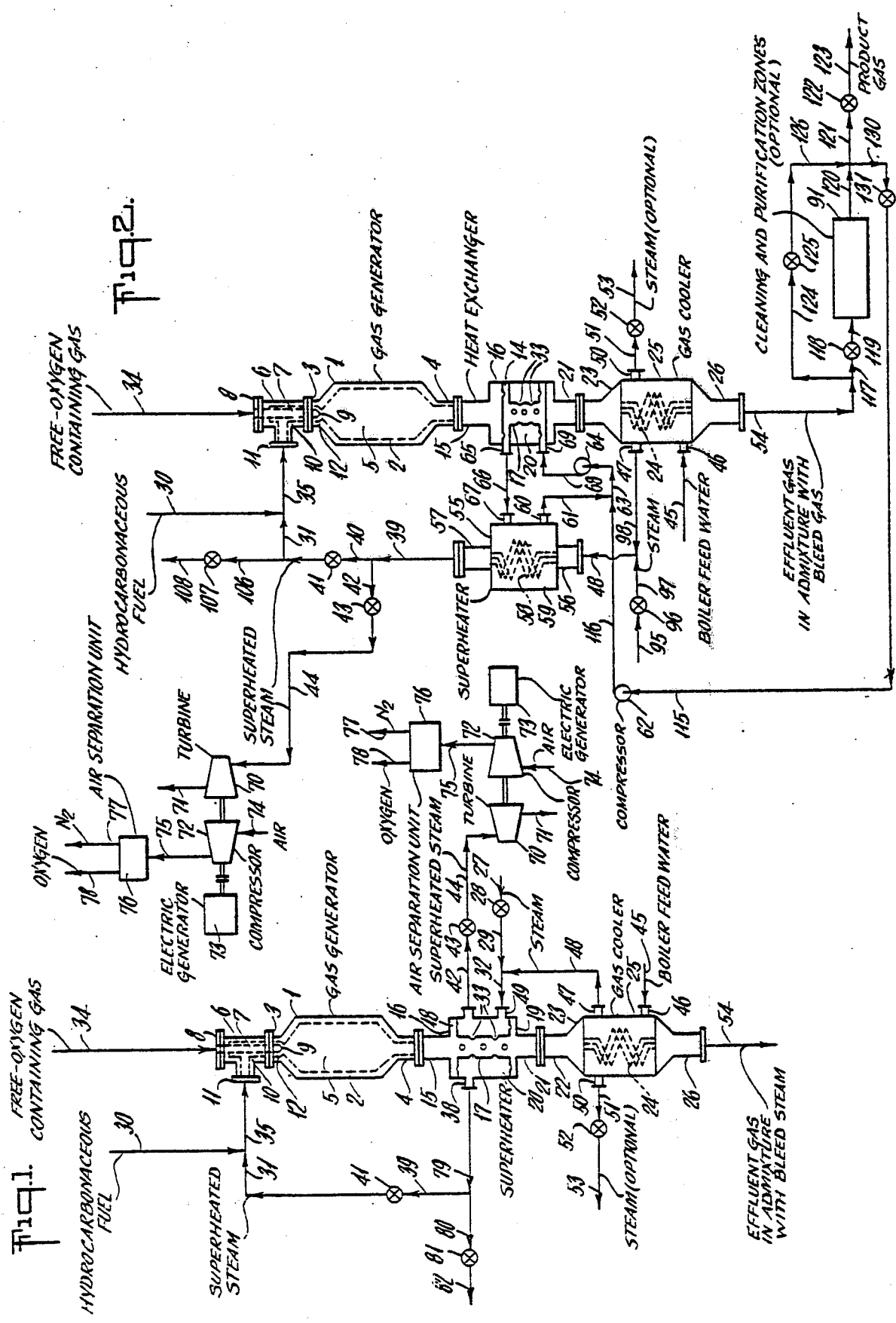

PARTIAL OXIDATION PROCESS

CROSS REFERENCE TO RELATED APPLICATION

This is a division of our copending application Ser. No. 855,645 filed Nov. 29, 1977, which is a continuation-in-part of our application Ser. No. 698,439 filed June 21, 1976, now U.S. Pat. No. 4,099,382.

BACKGROUND OF THE INVENTION

1. Field of the Invention

This invention pertains to a partial oxidation process for making synthesis gas, fuel gas, or reducing gas along with by-product superheated steam.

2. Description of the Prior Art

In the partial oxidation process, the effluent gas stream leaving the gas generator at a temperature in the range of about 1500° to 3000° F. must be cooled below the equilibrium temperature for the desired gas composition. This is presently done by quenching the effluent gas stream in water, or by cooling the gas stream in a gas cooler, thereby producing saturated steam. Both of these methods of gas cooling result in large increases in entropy and reduced thermal efficiencies. This problem is partially overcome in the subject process by the production of by-product superheated steam from heat extracted from the hot effluent gas stream leaving the partial oxidation gas generator at its maximum temperature.

Production of saturated steam, but not superheated steam is described in coassigned U.S. Pat. No. 3,528,930.

SUMMARY

A continuous stream of superheated steam is produced as a valuable by-product during the partial oxidation of a hydrocarbonaceous fuel, oxygenated hydrocarbonaceous fuel, or slurries of solid carbonaceous fuel to produce synthesis gas, fuel gas, or reducing gas. At least a portion of said superheated steam may be continuously recycled to the gas generator as a dispersent or carrier for the fuel, or as a temperature moderator. Optionally, at least a portion of said by-product superheated steam may be continuously introduced into a steam turbine as the working fluid to produce mechanical work or electrical energy. The high steam superheat temperature results in a higher conversion efficiency.

In the process, a continuous hot effluent gas stream from a partial oxidation gas generator is passed directly through a first heat exchange zone comprising a shell and tube heat exchanger in indirect heat exchange with a continuous stream of steam at a higher pressure than said effluent gas stream, thereby converting said steam into a continuous stream of superheated steam while simultaneously reducing the temperature of the continuous stream of effluent gas. A portion of said steam is continuously bled into said stream of effluent gas by way of openings in the walls of said tubes, thereby providing a protective sheath of steam between the surface of said tubes, and the stream of effluent gas passing through said first heat exchange zone. Optionally, the following additional steps may be included. The stream of partially cooled effluent gas containing said bleed steam leaving said first heat exchange zone and prior to being cleaned is passed through a second heat exchange zone in indirect heat exchange with water. Steam for superheating in the first heat exchanger, as previously described, is thereby produced.

Advantageously, the steam made by the subject process may be produced at a higher pressure than that of the effluent gas stream from the gas generator. Accordingly, the steam will flow through the openings in the walls of the tubing without further compression.

In another embodiment, the hot effluent gas stream leaving the reaction zone of the gas generator or optionally from a solids separation zone, at substantially the same temperature and pressure as in said reaction zone is passed directly through a first heat exchange zone comprising a shell and tube heat exchanger in heat exchange with a continuous stream of gaseous heat transfer fluid thereby cooling said hot effluent gas stream while simultaneously heating said gaseous heat transfer fluid. A portion of said gaseous heat transfer fluid is continuously bled into said stream of effluent gas passing through said first heat exchange zone by way of openings in the walls of said tubes and headers, if any, thereby providing a protective sheath or curtain of gaseous heat transfer fluid between the surfaces of said tubes and headers, if any, and said stream of effluent gas. The heated gaseous heat transfer fluid leaving the first heat exchange zone is introduced into a third heat exchange zone in indirect heat exchange with a stream of steam thereby cooling said gaseous heat transfer fluid and producing a stream of superheated steam. The mixture of effluent gas and the bleedstream portion of gaseous heat transfer fluid from the first heat exchange zone is cleaned, thereby producing a raw effluent product gas. A portion of the raw clean effluent product gas, as make-up, is mixed with the cooled heat transfer fluid leaving the third heat exchange zone and the gaseous mixture is introduced into the first heat exchange zone as said gaseous heat transfer fluid. Optionally, the following additional steps may be included.

The mixture of effluent gas and the bleedstream portion of gaseous heat transfer fluid leaving the first heat exchange zone and prior to being cleaned is passed directly through a second heat exchange zone in indirect heat exchange with a continuous stream of water, thereby converting said water into a stream of steam. Steam for superheating in the third heat exchanger, as previously described is thereby produced. Advantageously, the steam made by the subject process may be produced at a pressure which is greater than that in the gas generator.

BRIEF DESCRIPTION OF THE DRAWING

The invention will be further understood by reference to the accompanying drawing in which FIG. 1 is a schematic representation of a preferred embodiment of the process.

FIG. 2 is a representation of another embodiment of the process.

DESCRIPTION OF THE INVENTION

The present invention pertains to an improved continuous partial oxidation gasification process for producing raw synthesis gas, reducing gas, or fuel gas along with valuable by-product superheated steam. The aforesaid gas streams comprise $H_2$, $CO$, and at least one member of the group $H_2O$, $CO_2$, $H_2S$, $COS$, $CH_4$, $N_2$, $A_r$, and particulate carbon.

In the subject process, a continuous hot effluent gas stream of synthesis gas, reducing gas or fuel gas is produced in the refractory lined reaction zone of a separate free-flow unpacked noncatalytic partial oxidation fuel gas generator. The gas generator is preferably a vertical steel pressure vessel, such as shown in the drawing and described in coassigned U.S. Pat. No. 2,992,906.

The sensible heat in the hot effluent gas stream leaving the gas generator is used at its maximum temperature i.e. 1500° to 3500° F. to produce a continuous stream of superheated steam at a pressure which may exceed the pressure in the gas generator. A shell and tube heat exchanger in which steam or cleaned generator gas is bled from inside the tubes to the outside, or the reverse is employed in the process.

A wide range of combustible carbon containing organic materials may be reacted in the gas generator with a free-oxygen containing gas optionally in the presence of a temperature moderating gas to produce said effluent gas stream.

The term hydrocarbonaceous is used herein to describe various suitable feedstocks to the partial oxidation gas generator is intended to include gaseous, liquid, and solid hydrocarbons, carbonaceous materials, and mixtures thereof. In fact, substantially any combustible carbon containing organic material, fossil fuel, or slurries thereof, may be included within the definition of the term "hydrocarbonaceous." For example, there are (1) pumpable slurries of solid carbonaceous fuels, such as coal, lignite, particulate carbon, petroleum coke, concentrated sewer sludge, and mixtures thereof; (2) gas-solid suspensions, such as finely ground solid carbonaceous fuels dispersed in either a temperature moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous fuel may have a sulfur content in the range of about 0 to 10 weight percent and an ash content in the range of about 0 to 15 weight percent.

The term liquid hydrocarbon, as used herein to describe suitable liquid feedstocks, is intended to include various materials, such as liquefied petroleum gas, petroleum distillates and residues, gasoline, naphtha, kerosine, crude petroleum, asphalt, gas oil, residual oil, tar-sand oil and shale oil, coal derived oil, aromatic hydrocarbon (such as benzene, toluene, xylene fractions), coal tar, cycle gas oil from fluid-catalytic-cracking operation, furfural extract of coker gas oil, and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously, and may include paraffinic, olefinic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature or it may be preheated to a temperature up to as high as about 200° F. to 1,200° F., say 800° F. but preferably below its cracking temperature. Preheating the hydrocarbonaceous feed may be accomplished by non-contact heat exchange or direct contact with by-product superheated or saturated steam produced in the subject process. The hydrocarbonaceous feed may be introduced into the burner in liquid phase or in a vaporized mixture with a temperature moderator. Suitable temperature moderators include superheated steam, saturated steam, unsaturated steam, water, $CO_2$-rich gas, a portion of the cooled exhaust from a turbine employed downstream in the process, nitrogen in air, by-product nitrogen from a conventional air separation unit, and mixtures of the aforesaid temperature moderators.

The use of a temperature moderator to moderate the temperature in the reaction zone depends in general on the carbon to hydrogen ratio of the feedstock and the oxygen content of the oxidant stream. A temperature moderator may not be required with some gaseous hydrocarbon fuels, however, generally, one is used with liquid hydrocarbon fuels and with substantially pure oxygen. The temperature moderator may be introduced in admixture with either or both reactant streams. Alternatively, the temperature moderator may be introduced into the reaction zone of the gas generator by way of a separate conduit in the fuel burner.

From about 0 to 100% of the superheated steam produced subsequently in the subject process may be used to preheat and disperse the liquid hydrocarbonaceous feed, or to preheat and entrain the solid carbonaceous fuels that may be introduced into the gas generator.

The weight ratio of total amount of $H_2O$ to fuel introduced into the reaction zone of the gas generator is in the range of about 0 to 5.

When comparatively small amounts of $H_2O$ are charged to the reaction zone, for example through the burner to cool the burner tip, the $H_2O$ may be mixed with either the hydrocarbonaceous feedstock, the free-oxygen containing gas, the temperature moderator, or combination thereof. In such case, the weight ratio of water to hydrocarbonaceous feed may be in the range of about 0.0 to 1.0 and preferably 0.0 to less than 0.2.

The term free-oxygen containing gas, as used herein is intended to include air, oxygen-enriched air, i.e. greater than 21 mole % oxygen, and substantially pure oxygen, i.e. greater than 95 mole % oxygen, (the remainder comprising $N_2$ and rare gases). Free-oxygen containing gas may be introduced into the burner at a temperature in the range of about ambient to 1,800° F. The ratio of free oxygen in the oxidant to carbon in the feedstock (O/C, atom/atom) is preferably in the range of about 0.7 to 1.5.

The feedstreams are introduced into the reaction zone of the fuel gas generator by means of fuel burner. Suitably, an annulus-type burner, such as described in coassigned U.S. Pat. No. 3,874,592 may be employed.

The feedstreams are reacted by partial oxidation without a catalyst in the reaction zone of a free-flow gas generator at an autogenous temperature in the range of about 1500° F. to 3500° F. and at a pressure in the range of about 1 to 250 atmospheres absolute (atm. abs.) such as about 50 to 3700 psia. The reaction time in the fuel gas generator is about 1 to 10 seconds. The effluent stream of gas leaving the gas generator comprises $H_2$, CO and at least one member of the group $H_2O$, $CO_2$, $H_2S$, COS, $CH_4$, $N_2$, $A_r$, and particulate carbon. The amount of unreacted particulate carbon (on the basis of carbon in the feed by weight) is about 0.2 to 20 weight percent from liquid feeds but is usually negligible from gaseous hydrocarbon feeds. The specific composition of the effluent gas is dependent on actual operating conditions and feedstreams. Synthesis gas substantially comprises $H_2+CO$; all or most of the $H_2O$ and $CO_2$ are removed for reducing gas; and the $CH_4$ content may be maximized for fuel gas.

Preheating the hydrocarbonaceous feed may be accomplished by non-contact heat exchange or direct contact with by-product superheated, saturated, or unsaturated steam as produced in the subject process.

A continuous stream of hot effluent gas, at substantially the same temperature and pressure as in the reaction zone leaves from the axial exit port of the gas generator and is then introduced directly to the first heat exchange zone. Optionally, a solids separation zone (not shown in the drawing) may be inserted between the exit port of the gas generator and said first heat exchange zone. The solids separation zone may comprise a free-flow catch-pot i.e. slag chamber which may be inserted in the line before the first heat exchanger. By this means at least a portion of any solid matter i.e. particulate carbon, ash, slag, refractory, and mixtures thereof that may be entrained in the hot effluent gas stream, or which may flow from the gas generator i.e. slag, ash, bits of refractory, may be separated from the effluent gas stream and recovered with very little, if any, pressure drop in the line. A typical slag chamber that may be employed is shown in FIG. 1 of the drawing for coassigned U.S. Pat. No. 3,528,930. Thus in the subject process carbon from the effluent gas stream, scale, and solidified slag or ash from the fuel and refractory may be withdrawn periodically from a solids separation zone, such as from the lowermost portion of the slag-accumulation zone 23 in coassigned U.S Pat. No. 3,528,930.

A portion of the sensible heat in the effluent gas stream leaving the gas generator or the solids separation zone is recovered in a first heat exchange zone. This heat is used to convert steam produced elsewhere in the process into superheated steam at a pressure above the pressure in the gas generator. As shown in the drawing, in FIG. 1, the superheated steam in lines 39 and 42 is produced in heat exchange 16 by heat exchange between the effluent gas stream from the gas generator and steam. In FIG. 2, the superheated steam in line 39 is produced in heat exchanger 55 by heat exchange between a heat transfer fluid and steam. The heat transfer fluid was previously heated in heat exchanger 16 by heat exchange with the effluent gas stream from the gas generator.

In FIG. 1 of the drawing, the hot effluent gas stream from the generator passes in indirect i.e. noncontact heat exchange with a stream of steam produced in a second heat exchange zone located immediately downstream. By definition, the term "indirect" i.e. "noncontact" means that there is no mixing between the two gas streams. Preferably, these two streams run in opposite directions i.e. countercurrent flow. However, they may run in the same direction i.e. concurrent flow.

In FIG. 1 there is depicted a first shell and tube heat exchanger 16 which comprises a plurality of tubes or coils. Optionally, headers may be placed inside or outside of the shell. The tubes and optionally the headers, if any, are provided with openings in the walls through which at least a portion i.e. about 1-50 volume %, say 3-25 volume % of the steam passing up through the shell may be bled from outside the tubes to inside the tubes while simultaneously superheating the remainder of the steam on the shell side. Once inside the tubes or headers, the bleed steam mixes with the effluent gas stream passing directly through the tubes from the gas generator at a slightly lower pressure i.e. about 5-50 psia less. But before said mixing, the comparatively cooler bleed steam forms a continuously flowing protective sheath or curtain between the inside surface of the tubes and the effluent gas stream passing therethrough at a temperature in the range of about 1500° to 3500° F. In a similar manner, a continuously flowing protective sheath or curtain of steam may cover the surfaces of the headers, if any, that would ordinarily be contacted by the hot effluent gas stream. By this means the surfaces of the tubes and headers, if any, such as the upstream header, may be cooled and protected against corrosive gas attack, as well as from deposits of ash, slag, and soot.

Altenatively, shell and tube heat exchange 16 may be arranged so that the hot effluent gas stream from the gas generator passes down through on the shell side while the steam passes through the tubes and any headers. In such case, for example at least a portion of the steam i.e. 1-50, say 3-25 vol. % of the steam may be bled from inside of the tubes and headers, if any, to the outside. Further, the bleed steam provides a protective sheath between the outside of the tubes and headers, if any, and the effluent gas stream from the gas generator. The remainder of the steam, passing through the tubes is superheated.

Optionally, the downstream ends of the tubing and the downstream header, if any, may have no or a reduced amount of bleed holes, since the temperature of the effluent gas stream at this point has been reduced by heat transfer to below the temperature that corrosion may take place with $H_2S$ in the effluent gas stream. For similar reasons, high class materials will only be required in the upstream (hot) end of the tubes.

The openings in the walls of the tubes and headers, if any, may be small diameter holes in the range of about 0.001 to 0.062 inches. The holes are positioned around the periphery of the tubing and the number is such that sheath flow is allowed to bleed out around the entire periphery of the tube. Two dissimilar metals may be joined by a close fitting slip joint, thereby permitting thermal expansions and bleeding. For example, longitudinal spacing ridges on the male end of the slip joint would provide a gap that is controlled for a design leakage flow when the joint is assembled. Heat resistant porous materials including metals and ceramics, may also be used as construction materials.

The stream of steam to be converted into superheated steam enters the first heat exchanger at a temperature in the range of about 298° to 705° F., and a pressure in the range of about 65 to 3800 psia. The superheated steam leaves the first heat exchanger at a temperature in the range of about 750° to 1100° F. and a pressure in the range of about 65 psia to 3800 psia. Advantageously, the superheated steam made by the subject process may be produced at a pressure which is greater than the pressure in the reaction zone of the gas generator. Accordingly, the steam will flow through the openings in the wall of the heat exchanger tubes without being compressed. The high steam superheat temperature results in a high conversion efficiency when said superheated steam is employed as the working fluid in an expansion turbine for producing mechanical power or electrical energy. The hot effluent gas stream from the gas generator or solids separation zone at substantially the same temperature and pressure as in the reaction zone enters the first heat exchange zone at a temperature in the range of about 1500° F. to 3500° F. and a pressure in the range of about 1 to 250 atm. abs., such as about 45 to 3700 psia.

While in the first heat exchange zone, the effluent gas stream may have increased in mole % $H_2O$ in the range of about 1 to 50, say about 3 to 25. Advantageously, when the effluent gas streams leaving the first heat exchange zone is subjected to water-gas shift reaction downstream in the process, it is desirable to bleed sufficient steam into the effluent gas stream in the first heat exchange zone so that the mole ratio $H_2O/CO$ of the gaseous mixture is in the range of about 0.5 to 8. The cooled gas stream, if clean, may be the product gas.

In another embodiment, in order to produce the steam for superheating in the first heat exchange zone, the partially cooled effluent gas stream may leave the first heat exchange zone at a temperature in the range of about 600° F. to 2600° F. and a pressure in the range of about 45 to 3700 psia and then enter a second heat exchange zone i.e. gas cooler 23 with substantially no reduction in temperature and pressure where it passes in noncontact heat exchange with boiler feed water.

The raw effluent gas stream leaves said second heat exchange zone at a temperature in the range of about 300° to 700° F. and a pressure which is substantially the same as in the reaction zone of the gas generator less ordinary pressure drop in the lines, any solids removal zone, and first and second heat exchange zones i.e. total pressure drop may be about 2 atmospheres absolute or less. The raw effluent gas stream may comprise in mole % $H_2$ 70 to 10, CO 15 to 57, $CO_2$ 0 to 5, $H_2O$ 1 to 50, $N_2$ 0 to 75, $A_r$ 0 to 1.0, $CH_4$ 0 to 25, $H_2S$ 0 to 2.0, and COS 0 to 0.1. Unreacted particulate carbon (on the basis of carbon in the feed by weight) may be about nil to 20 weight percent. Optionally, the raw effluent gas stream leaving the second heat exchange zone may be sent to conventional gas cleaning and purification zones downstream where unwanted constituents may be removed.

The boiler feed water enters the second heat exchange zone at a temperature in the range of about ambient to 675° F. and leaves as unsaturated or saturated steam at a temperature of about 298°–705° F. and a pressure in the range of about 65–3800 psia. Advantageously, the unsaturated or saturated steam may be produced at a pressure which is greater than the pressure in the reaction zone of the gas generator. While countercurrent flow is preferred in the second heat exchanger 23, as shown in FIG. 1, concurrent flow may be employed. Further, in another embodiment, the stream of steam may be produced in the tubes while the effluent gas stream is passed through the shell side.

From about 0 to 100 weight percent of the steam produced in the second heat exchange zone is passed into the first heat exchange zone where superheated steam is produced having a pressure greater than the pressure in the gas generator. Optionally, a portion of the steam may be used elsewhere in the process or exported. Superheated, saturated, or unsaturated steam produced in the process may be used to provide heat. For example steam may be used to preheat the feed-streams to the gas generator. In this manner, hydrocarbonaceous fuel may be preheated to a temperature up to about 800° F. but below its cracking temperature with at least a portion of the steam produced by the subject process. it may also be used in the gas generator as a temperature moderator.

At least a portion of the by-product superheated steam produced by the subject process may be introduced into the partial oxidation gas generator where it may react and thereby contribute to the amount of hydrogen in the effluent gas stream. Further, the thermal efficiency of the process is improved. Condensation problems that may result when steam and hydrocarbonaceous fuels are mixed together may be avoided by using superheated steam. Advantageously, a portion of the superheated steam may be used as the working fluid in a turbocompressor to compress air feed to an air separation unit for producing substantially pure oxygen (95 mole % or more). At least a portion of this oxygen may be introduced into the gas generator as the oxidant reactant. The superheated steam may also be used as the working fluid in a turboelectric generator. Starting with superheated steam at a very high temperature level and converting the heat into electricity favorably affects the conversion efficiency.

Heat exchange zones 1 and 2 are shown in FIG. 1 of the drawing preferably as two separate heat exchangers 16 and 23 that are joined together. The advantages of this scheme are to simplify the design and reduce the size of each heat exchanger thereby reducing equipment costs. System down-time may be minimized in case one of the units has to be replaced for maintenance or repair. In another embodiment, heat exchange zones 1 and 2 may be contained in a common shell.

Another embodiment of the invention is shown in FIG. 2 of the drawing. There the hot effluent gas stream from the gas generator or, optionally, from a free-flow solids, slag, or both separation zone and at substantially the same temperature and pressure as that in the reaction zone enters the first heat exchanger 16 at a temperature in the range of about 1500° F. to 3500° F. and a pressure e.g. in the range of about 50 to 3700 psia. The solids or slag separation zone is not shown in the drawing. By offering substantially no obstruction to the free-flow of the effluent gas stream, the solids separator provides substantially no pressure drop in the line.

Heat exchanger 16 in FIG. 2 is a shell and tube heat exchanger whose construction is similar to that described previously in connection with heat exchanger 16 in FIG. 1. However, instead of steam, at least a portion of a gaseous heat transfer fluid is bled from inside the tubes or header, if any, to the outside, or the reverse and mixed with the surrounding hot effluent gas stream passing through heat exchanger 16. A comparatively cooler continuously flowing protective sheath or curtain of heat transfer fluid is thereby placed between the surfaces of the tubes and headers, if any, and the surrounding effluent gas stream from the gas generator. The unbled portion of the gaseous heat transfer fluid is heated to a temperature in the range of about 1300° to 2800° F. in heat exchanger 16 and is then introduced into a third heat exchanger i.e. 55 where it passes in indirect heat exchange with steam, thereby producing superheated steam.

Simultaneously, the effluent gas stream passing through the first heat exchange zone i.e. 16 is cooled and leaves at a temperature in the range of about 600° F. to 2600° F. and a pressure in the range of about 45 to 3700 psia.

The cooled effluent gas stream leaving the first heat exchange zone is cleaned by conventional methods to remove any unwanted entrained solids i.e. particulate carbon, ash, and optionally the gas stream may be purified by removing acid-gases i.e. $CO_2$, $H_2S$, COS. At least a portion i.e. 1–50, say 3–25 vol.% of the clean and optionally purified effluent gas stream at a temperature in the range of about 100° to 700° F. is recycled and mixed with the cooled heat transfer fluid leaving said third heat exchange zone to make-up for the clean effluent gas stream that bleeds through heat exchanger 16 into the surrounding effluent gas stream passing through the first heat exchange zone. The gas mixture at a temperature in the range of about 200° to 2400° F., say 600°-1400° F., is then passed through heat exchange zone 1 as the gaseous heat transfer fluid, as previously described.

In another embodiment of the process, steam for superheating in said third heat exchange zone is produced by extracting a portion of the heat left in the effluent gas stream leaving the first heat exchange zone, and before said gas stream enters the aforesaid gas cleaning zone. Thus, the effluent gas stream leaving the first heat exchange zone 16 passes directly into a second heat exchange zone i.e. gas cooler 23 at substantially the same exit temperature and pressure from heat exchanger 16. In gas cooler 23 the effluent gas stream passes in noncontact heat exchange with boiler feed water. The boiler feed water enters at a temperature in the range of about ambient to 675° F. and leaves as saturated or unsaturated steam at a temperature of about 298° to 705° F. and a pressure of about 65 to 3800 psia. Advantageously, the saturated or unsaturated steam may be produced at a pressure which is greater than the pressure in the reaction zone of the gas generator. The effluent gas stream leaves gas cooler 23 at a temperature in the range of about 300° to 700° F. and at a pressure which is about the same as in the reaction zone of the gas generator less ordinary pressure drop in the lines and vessels.

Simultaneously, with the heat exchange going on in heat exchangers 16 and 23, a continuous stream of superheated steam at a temperature in the range of about 750° to 1100° F. and a pressure in the range of about 65 to 3800 psia is produced in a third heat exchange zone i.e. heat exchanger 55 by noncontact heat exchange between a continuous stream of steam from the previously described second heat exchange zone 23 and a continuous stream of said heat transfer fluid from said first heat exchange zone 16. Advantageously, the superheated steam may be produced with a pressure that is greater than the pressure in the reaction zone of the gas generator. The heat transfer fluid enters heat exchanger 55 from heat exchanger 16 at a temperature in the range of about 800° to 2800° F., say 800° to 1800° F. leaves exchanger 55 in the range of about 500° to 2500° F., say 600° to 1500° F., is mixed with a recycle make-up portion of the effluent product gas stream at a temperature in the range of about 100° to 700° F. and a pressure above that of the raw effluent gas stream, and is then introduced into heat exchanger 16, where it passes in noncontact heat exchange with the effluent gas stream from the gas generator, as previously described. Advantageously, by the embodiment depicted in FIG. 2, the sensible heat in a stream of effluent gas from the gas generator may be used to produce superheated steam in a comparatively clean environment.

The raw effluent gas stream leaving the second heat exchange zone 23 may comprise in mole % $H_2$ 70 to 10, CO 15 to 57, $CO_2$ 0 to 5, $H_2O$ 0 to 20, $N_2$ 0 to 75, $A_r$ 0 to 1.0, $CH_4$ 0 to 25, $H_2S$ 0 to 2.0, and COS 0 to 0.1. Unreacted particulate carbon (on the basis carbon in the feed by weight) may be about nil to 20 weight percent. Optionally, at least a portion of the raw effluent gas stream may be cleaned and purified by conventional means to remove unwanted constituents. At least a portion of this product gas may be used as the heat transfer fluid. For example, mixtures of $H_2+CO$ having the following composition in mole % may be produced: $H_2$ 10 to 48, CO 15 to 48, and the remainder $N_2+A_r$. Further, substantially pure $H_2$ i.e. 98 mole % or more for use as the heat transfer fluid may be prepared from the effluent gas stream by well known gas cleaning and purification techniques, including the water-gas shift reaction. Acid-gases may be removed by conventional solvent absorption processes.

Conventional shell and tube type heat exchangers may be used in the second and third heat exchange zones. The two separate streams passing in heat exchange with each other may be passed in the same or opposite directions. Either stream may be passed through the tubes while the other may be passed on the shell side. By properly insulating the lines, gas generator 1, and heat exchangers 16, 23, and 55, the temperature drop between the pieces of equipment may be kept very small i.e. less than 10° F. Heat resistant metals and refractories are used as construction materials. Heat exchangers 16 and 23 are preferably separate heat exchangers that are joined together. Further details of this construction will be discussed below in connection with FIG. 1. In another embodiment, heat exchange zones 1 and 2 may be contained in a common shell.

DESCRIPTION OF THE DRAWING

A more complete understanding of the invention may be had by reference to the accompanying schematic drawing which shows the two embodiments of the previously described process in detail. All of the lines and equipment are preferably insulated to minimize heat loss.

Referring to the figures in the drawing in FIG. 1, free-flow noncatalytic partial oxidation gas generator 1 lined with refractory 2 as previously described has an upstream axially aligned flanged inlet port 3, a downstream axially aligned flanged outlet port 4, and an unpacked reaction zone 5. Annulus type burner 6, as previously described, with center passage 7 in alignment with the axis of gas generator 1 is mounted in inlet port 3. Center passage 7 has an upstream inlet 8 and a converging conical shaped downstream nozzle 9 at the tip of the burner. Burner 6 is also provided with concentric coaxial annulus passage 10 that has an upstream inlet 11 and a downstream conical shaped discharge passage 12. Burners of other design may also be used.

Connected to outlet port 4 is the flanged inlet 15 of a shell and tube high temperature heat exchanger 16, having internal tubes or multiple-coils 17, connected to upstream header 18 and downstream header 19, a shell side 20, and a downstream header 19, a shell side 20, and a downstream flanged outlet 21. Optionally, a free-flow solids or slag separator (not shown in the drawing) which produces little or no pressure drop may be inserted in the line between outlet 4 of gas generator 1 and inlet 15 of heat exchanger 16. Connected to outlet 21 of heat exchanger 16 is the upstream flanged inlet 22 of shell and tube gas cooler 23, of conventional design, having internal tubes 24, shell side 25, and a downstream flanged outlet 26.

A continuous stream of hydrocarbonaceous feed in liquid or vapor form or pumpable slurries of a solid carbonaceous fuel, as previously described, may be introduced into the system by way of line 30, and optionally mixed with a continuous stream of superheated steam from line 31 or a stream of saturated steam from line 53 in a mixer (not shown). The feed mixture is then passed through line 33, inlet 11, annulus passage 10, and discharge passage 12 of burner 6 into reaction zone 5 of partial oxidation gas generator 1.

Simultaneously, a continuous stream of free-oxygen containing gas as previously described, from line 34 is passed through center passage 7 and nozzle 9 of burner 6 into reaction zone 5 of gas generator 1 in admixture with said hydrocarbonaceous fuel and steam.

The continuous stream of effluent gas leaving partial oxidation gas generator by way of outlet 4 is passed through heat exchanger 16 in heat exchange with a counterflowing stream of steam produced in gas cooler 23. Alternatively, steam from another source may be introduced through lines 27, 28, 29, 32 and 49. For example, at least a portion of the steam passing upwardly on the shell side 20 of heat exchanger 16 (also called superheater 16) is passed through holes 32 in walls of tubing 17 and upstream header 18 and is then mixed with the hot effluent gas stream from gas generator. The remainder of the steam is converted into superheated steam which exits by way of outlet 38, lines 79,39, valve 41, line 31, and mixed with the hydrocarbonaceous fuel from line 30 in line 35. Optionally, a stream of superheated steam may be withdrawn from superheater 16 by way of line 42, valve 43, line 44, and introduced into a steam turbine 70 as the working fluid, and leaves through line 71. Turbine 70 powers air compressor 72 and optionally electric generator 73. Air enters compressor 70 through line 74 and leaves through line 75. In air-separation zone 76, the compressed air is separated into $N_2$ in line 77 and oxygen in line 78. Optionally, superheated steam may be withdrawn from superheater 16 through outlet 38, lines 79-80, valve 81, and line 82.

The partially cooled effluent gas stream containing said bleed stream leaves superheater 16 through outlet 21 and enters waste heat boiler 23 by way of inlet 22. In passing down through gas cooler 23, the mixture of effluent gas stream and bleed steam passes in noncontact indirect heat exchange with a counterflowing stream of boiler feed water. The boiler feed water is thereby heated to produce steam by absorbing at least a portion of the remaining sensible heat in the mixture of effluent gas stream and bleed stream. Thus, the boiler-feed water in line 45 enters heat exchanger 23 through inlet 46. It passes up on shell side 25, and leaves through outlet 47 and line 48 as steam. The steam enters superheater 16 through line 32, inlet 49 and is converted into superheated steam as previously described. Optionally, a portion of the steam is removed from gas cooler 23 by way of outlet 50, line 51, valve 52, and line 53. This steam may be used elsewhere in the system.

The cooled mixture of effluent gas stream and bleed steam leaves gas cooler 23 by way of bottom outlet 26, line 54, and may be sent to conventional gas cleaning and optionally to a purification zone downstream. The cleaned and optionally purified product gas may be used as synthesis gas, reducing gas, or fuel gas, depending on its composition. For example, clean product gas may be introduced into the combustor of a gas turbine (not shown). The gaseous products of combustion pass from the combustor to an expansion turbine as the working fluid. The turbine may drive a turbocompressor, or a turboelectric generator. The turbocompressor may be used to compress air for use in the system. The electric generator may provide electrical energy for use in the process.

Referring to FIG. 2 in the drawing, the process equipment is similar to that previously described with the exception of an additional shell and tube heat exchanger 55 and cleaning and optional purification zones 91. Heat exchanger 55 comprises bottom flanged inlet 56, top flanged outlet 57, internal tubes or coils 58, shell side 59, lower side outlet 60 and upper side outlet 67.

A recycle make-up portion of the effluent product gas stream in line 115 is compressed by gas compressor 62 to a greater pressure than that of the raw effluent gas stream leaving gas generator 1. The cooler compressed make-up gas is then mixed in line 63 with the gaseous heat transfer fluid leaving superheater 57 through lower side outlet 60 and line 61. By means of gas circulator 64, the gaseous heat exchange fluid is passed through line 68, inlet 69, and downstream header 13 of shell and tube heat exchanger 16. There the gaseous heat transfer fluid passes up through a plurality of tubes or coils 17, and then leaves through upstream header 14 and outlet 65. While moving upward through heat exchanger 16, a portion of the gaseous heat transfer fluid bleeds through small diameter holes or slots 33 in the walls of the tubes and optionally in the headers. The bleed gas forms a protective sheath or curtain between the outside surface of the headers and tubes and the effluent gas stream passing down through heat exchanger 16 on shell side 20. The bleed gas then mixes with the effluent gas stream, and the partially cooled gas stream leaves through outlet 21. The heated gaseous heat transfer fluid from outlet 65 passes through line 66, inlet 67 of heat exchanger 55 and then down through shell side 59 and out through bottom outlet 60 for recirculation to heat exchanger 16 and reheating, as previously described.

In the operation of the embodiment of the process shown in FIG. 2, the stream of gaseous heat transfer fluid is heated in tubes 17 of heat exchanger 16 by absorbing a portion of the sensible heat in the effluent gas stream passing directly from gas generator 1 or alternatively directly from a solids and slag separator (not shown in the drawing) down through the shell side 20. As previously described, the up flowing stream of gaseous heat transfer fluid in heat exchanger 16 passes in noncontact indirect heat exchange with the down-flowing continuous stream of hot effluent gas. Then in heat exchanger 55, the amount of sensible heat given up by the stream of heat transfer fluid continuously passing down through shell side 59 is sufficient to heat the continuous stream of up-flowing steam in tubes 58 with which it passes in noncontact indirect heat exchange to produce said superheated steam.

The superheated steam leaves through line 39 and a portion may be passed through line 40, valve 41, lines 105, 31, and mixed in line 35 with hydrocarbonaceous fuel from line 30. The feed mixture is then introduced into gas generator 1 by way of burner 6. The remainder of the superheated steam may be exported through line 106, valve 107, and line 108. Optionally, a portion of the superheated steam may be used as the working fluid in steam turbine 70, in the manner described for the superheated steam in line 44 of FIG. 1.

The saturated or unsaturated steam in line 48 may be produced in gas cooler 23, or elsewhere in the system and introduced through line 95, valve 96 and line 97. In the latter case, gas cooler 23 may be eliminated and at least a portion of the effluent gas stream leaving heat exchanger 16 i.e. 1–100 vol. % may be introduced into gas cleaning and optional purification zone 91. Optionally, a portion of the gas stream may by-pass cleaning or cleaning and purification zones 91 by way of line 124, valve 125, and line 126. Clean and optionally purified product gas is produced in 91 and at least a portion is recycled as make-up gas to compressor 62. The remainder of the product gas in line 121 may be used, for example, as fuel gas in the combustor of a gas turbine. The flue gas from the combustion chamber is introduced into an expansion turbine as the working fluid. The expansion turbine may be used to drive a compressor or an electric generator, as previously described. Other uses for the product gas have been described previously. In said other embodiment, the steam for superheater 55 is produced in waste heat boiler 23 by passing boiler feed water in line 45 through inlet 46 and shell side 25 thereby absorbing at least a portion of the sensible heat remaining in the down-flowing mixture of effluent gas stream and bleedstream in tubes 24 which leaves by outlet 26 and line 54. At least a portion of the steam produced in gas cooler 23 may be introduced into superheater 55 by way of outlet 47, lines 98, 48 and flanged inlet 56. Optionally, superheated steam from line 39 or steam from line 53 may be introduced into gas generator 1 as a temperature moderator and as a trnasport medium for the hydrocarbonaceous fuel. Alternatively, the effluent gas stream from gas generator 1 may be passed through the tubes in heat exchangers 16 and 23 connected in series. In such case, the gaseous heat transfer fluid in line 68 will pass through the shell side of heat exchanger 16. A portion of the heat transfer fluid will then bleed through the walls of the tubes and header and then into the effluent gas stream flowing down through the tubes. However, first a protective sheath of gaseous heat transfer fluid is formed on the inside surfaces of the tubes and both of the headers. Optionally, only the upstream header may be equipped with bleed holes.

The cooled effluent gas stream leaving through line 54 is passed through line 117, valve 118, line 119, and into a cleaning and optional purification operation as shown as 91 in the drawing. The cleaned and optionally purified gas leaves through lines 120–121, valve 122, and line 123. When the product gas in line 123 is fuel gas, a portion may be burned in a gas furnace to produce heat. Alternatively, a portion may be introduced into the combustor of a gas turbine (not shown). The combustion gases pass through an expansion turbine for the product of mechanical energy. The product gas may also comprise synthesis gas, reducing gas, or pure hydrogen. At least a portion of the effluent gas stream plus bleedgas in line 54 may by-pass cleaning and purification zones 91 by way of line 124, valve 125, and line 126.

A portion of the product gas in line 120 is used as make-up to replace the gaseous heat transfer fluid bled through the openings in tubes 17 and headers 13 and 14 of heat exchanger 16. This make-up gas stream is cooler than the gaseous heat transfer fluid in line 61 and is passed through line 130, valve 131, line 115, and compressed in compressor 62 to above the pressure of the effluent gas stream on shell side 20 of heat exchanger 16. As previously described, the compressed make-up gas is mixed with the gaseous heat transfer fluid from line 61 and the mixture is circulated in the loop between heat exchangers 16 and 55.

EXAMPLES

The following examples illustrate embodiments of the process of this invention. While preferred modes of operation are illustrated, the examples should not be construed as limiting the scope of the invention. The process is continuous and the quantities specified are on an hourly basis for all streams of materials.

EXAMPLE 1

The embodiment of the invention represented by Example 1 is depicted in FIG. 1 of the drawing as previously described. 3,352,958 standard cubic feet (SCF) of raw synthesis gas are continuously produced in a free-flow noncatalytic gas generator by partial oxidation of a hydrocarbonaceous fuel to be further described with oxygen (about 99.7 volume percent purity). The hydrocarbonaceous fuel is a pumpable slurry comprising 1,036 pounds of particulate carbon recovered later by cleaning the raw synthesis gas product and 57,300 pounds of reduced crude oil having the following ultimate analysis in Wt. %: C 85.87, $H_2$ 11.10, S 2.06, $N_2$ 0.78, $O_2$ 0.16, and ash 0.04. Further the reduced crude oil has an API gravity of 12.5, a heat of combustion of 18,333 BTU per pound, and a viscosity of 479 Saybolt Second Furol at 122° F.

About 28,650 pounds of superheated steam produced subsequently in the process at a temperature of 750° F. and a pressure of about 600 psia are mixed with said reduced crude oil to produce a feed mixture having a temperature of about 583° F. which is continuously introduced into the annulus passage of an annulus-type burner and which discharges into the reaction zone of said gas generator. About 744,062 SCF of oxygen at a temperature of about 500° F. are continuously passed through the center passage of said burner and mixed with the dispersion of superheated steam and crude oil.

Partial oxidation and related reactions take place in the free-flow reaction zone of the gas generator to produce a continuous effluent stream of raw synthesis gas at a temperature of 2,380° F. and a pressure of 415 psia. The effluent stream of hot raw synthesis gas from the gas generator passes through the tubes of separate shell and tube heat exchanger or superheater where it is cooled to a temperature of 2,055° F. by heat exchange with a continuous stream of saturated steam produced subsequently in the process. 144,798 lbs. of saturated steam enter the shell side of the superheater at a temperature of 488° F. and a pressure of 610 psia. About 90 vol. % of the saturated steam leave the heat exchanger as superheated steam at a temperature of 750° F. and a pressure of 600 psia. As previously described, a portion of this continuous stream of superheated steam is introduced into the gas generator, preferably in admixture with the crude oil. Optionally, a portion of the superheated steam is used as the working fluid in a turbocompressor for example in an air separation plant for producing the free-oxygen feed to the gas generator. The remainder of the saturated steam i.e. about 14,479 lbs. that is introduced into the superheater bleeds through small diameter holes in the tubes and upstream header and mixes with the hot raw synthesis gas passing therethrough. A sheath of steam lines the inside surface of the tubes, thereby protecting the tubes from corrosive attack by the raw synthesis gas. Further, no carbon or ash deposits out on the inside surface of the tubes.

The partially cooled stream of raw synthesis gas in admixture with bleed steam leaving the superheater is then passed through the tubes of a separate conventional gas cooler and cooled to a temperature of about 520° F. by heat exchange with 144,798 lbs. of boiler feed water supplied in a continuous stream on the shell side. A stream of about 144,798 lbs. of said by-product saturated steam is thereby produced at a temperature of about 488° F. and a pressure of about 610 psia. As previously described, this saturated steam is passed into the superheater or for conversion into superheated steam.

The continuous effluent stream of raw synthesis gas leaving said gas cooler after heat exchange with said boiler feed water is at a pressure which is substantially the same as that in the reaction zone of the gas generator less ordinary pressure drop in the lines and heat exchangers. This pressure drop may be less than about 20 psia. The composition of the stream of raw synthesis gas leaving the gas cooler is as follows (mole % dry basis) $H_2$ 46.95, CO 46.99, $CO_2$ 5.19, $H_2S$ 0.45, COS 0.02, $CH_4$ 0.14, $N_2$ 0.23, and $A_r$ 0.03. About 1,045 pounds of unconverted particulate carbon are entrained in the effluent stream of raw synthesis gas. Particulate carbon and other gaseous impurities may be removed from the raw synthesis gas in downstream gas cleaning and purifying zones. Optionally, a portion of said superheated steam may be mixed with the synthesis gas stream and then subjected to water-gas shift to convert carbon monoxide in the gas stream to hydrogen and carbon dioxide. The $CO_2$ may be then removed to produce a gas stream comprising hydrogen.

EXAMPLE II

The embodiment of the invention represented by Example II is depicted in FIG. 2 of the drawing, as previously described.

The type and amounts of materials fed to the free-flow noncatalytic gas generator in Example II are substantially the same as those previously described for Example I. Similarly, the composition and amount of raw synthesis gas, and the amounts of saturated steam and superheated steam produced are substantially the same in Examples I and II. Further, the operating temperature and pressures in the gas generator and related heat exchangers, and for the related streams of materials and products are substantially the same in both examples.

In Example II, 20,619 lbs. of hydrogen as produced downstream in the process are cycled continuously between heat exchanger 16 and separate superheater 55 as the heat transfer fluid.

The continuous effluent stream of raw synthesis gas from the gas generator at a temperature of 2,380° F. and a pressure of 415 psia is reduced to a temperature of 2,055° F. by heat exchange with said heat transfer fluid which enters separate heat exchanger 16 at a temperature of 850° F. and leaves at a temperature of 1,482° F. The temperature of the continuous stream of raw synthesis gas in admixture with bleed hydrogen is then reduced further by heat exchange with boiler feed water in gas cooler 23. A continuous stream of saturated steam produced in gas cooler 23 at a temperature of 488° F. is then converted into a continuous stream of superheated steam at a temperature of 750° F. and a pressure of 600 psia in separate superheater 55 by non-contact heat exchange with said heat transfer fluid in admixture with make-up hydrogen which enters superheater 55 at a temperature of 1,482° F.

The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

We claim:

1. In the process for producing gaseous mixtures comprising $H_2$, CO and containing at least one member of the group $H_2O$, $CO_2$, $H_2S$, COS, $CH_4$, $N_2$, $A_r$, and particulate carbon by the partial oxidation of a hydrocarbonaceous fuel, or liquid oxygenated hydrocarbonaceous fuel, or a slurry of solid carbonaceous fuel and water or a liquid hydrocarbon with a free oxygen containing gas and optionally in the presence of a temperature moderator, at a temperature in the range of about 1 to 250 atmospheres absolute in the reaction zone of a free-flow noncatalytic gas generator, the improvement comprising: (1) continuously passing the effluent gas stream leaving the reaction zone of said gas generator through a first heat exchange zone comprising a shell and tube heat exchanger in heat exchange with a continuous stream of steam, at a higher pressure than said effluent gas stream, thereby converting said steam into a continuous stream of superheated steam while simultaneously reducing the temperature of the continuous stream of effluent gas, and simultaneously continuously bleeding a portion of said steam into said stream of effluent gas by way of openings in the walls of said tubes while placing a sheath of steam between the surface of said tubes and the stream of effluent gas passing through said first heat exchange zone; (2) removing from said first heat exchange zone a continuous stream of effluent gas containing said bleed steam; and (3) simultaneously removing a continuous stream of said superheated steam from said first heat exchange zone.

2. The process of claim 1 wherein the stream of steam is introduced into the first heat exchange zone in step (1) at a temperature in the range of about 298° to 705° F. and a pressure in the range of about 65 to 3800 psia and is converted into said stream of superheated steam at a temperature in the range of about 750° to 1100° F. and a pressure in the range of about 65 to 3800 psia.

3. The process of claim 1 wherein the pressure of the superheated steam produced in step (1) is greater than the pressure in the reaction zone of the gas generator.

4. The process of claim 1 wherein at least a portion of the superheated steam from step (3) is introduced as the working fluid into a steam turbine for producing mechanical work or electrical energy.

5. The process of claim 1 wherein at least a portion of the superheated steam from step (3) is introduced into the reaction zone of said gas generator.

6. The process of claim 1 wherein at least a portion of the superheated steam from step (3) is a carrier for said hydrocarbonaceous fuel feed to the gas generator.

7. The process of claim 1 wherein at least a portion of the superheated steam from step (3) is used as the working fluid in a steam turbine used to compress air feed to an air separation unit thereby producing oxygen (95 mole % or more) for reacting in said gas generator.

8. The process of claim 1 provided with the additional step of removing at least a portion of unwanted solid matter from the group particulate carbon, ash, slag, scale, refractory, and mixtures thereof entrained in the effluent gas stream leaving the gas generator or flowing from the gas generator prior to introducing said gas stream into said first heat exchange zone.

9. The process of claim 1 wherein the free-oxygen containing gas is selected from the group consisting of air, oxygen-enriched air (more than 21 mole % $O_2$) and substantially pure oxygen (more than 95 mole % $O_2$).

10. The process of claim 1 wherein said hydrocarbonaceous fuel is a liquid hydrocarbon selected from the group consisting of liquefied petroleum gas, petroleum distillates and residues, gasoline, naphtha, kerosine, crude petroleum, asphalt, gas oil, residual oil, tar-sand oil, shale oil, coal derived oil, aromatic hydrocarbons such as benzene, toluene, xylene fraction, coal tar, cycle gas oil from fluid-catalytic-cracking operation, furfural extract of coker gas oil, and mixtures thereof.

11. The process of claim 1 wherein said hydrocarbonaceous fuel is a gaseous hydrocarbon.

12. The process of claim 1 wherein said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials and mixture thereof.

13. The process of claim 1 wherein said hydrocarbonaceous fuel is a pumpable slurry of solid carbonaceous fuel selected from the group consisting of coal, lignite, particulate carbon, petroleum coke, and concentrated sewer sludge and mixtures thereof, in a vaporizable carrier such as water, liquid hydrocarbon and mixtures thereof.

14. The process of claim 1 further provided with the step of preheating the hydrocarbonaceous fuel to a temperature up to about 800° F. but below its cracking temperature with at least a portion of the superheated steam produced in step (3) prior to introducing said fuel into the gas generator.

15. The process of claim 1 provided with the additional steps of cleaning and optionally purifying the stream of partially cooled effluent gas containing bleed steam from step (2).

16. The process of claim 1 provided with the added steps of (4) continuously passing the stream of effluent gas containing bleed steam from step (2) directly into a second heat exchange zone where it passes in noncontact heat exchange with a stream of water, thereby converting said water into a continuous stream of steam, while simultaneously reducing further the temperature of the continuous stream of effluent gas; (5) removing a stream of raw effluent product gas from (4); and (6) introducing at least a portion of the stream of steam from (4) into the first heat exchange zone in step (1) as said steam.

17. The process of claim 16 wherein the first heat exchange zone in step (1) and the second heat exchange zone in step (4) are shell and tube type heat exchangers, and the effluent gas stream from said gas generator is serially passed through the tubes of said heat exchangers in steps (1) and (4) while simultaneously water is converted into steam while being passed through the shell side of the heat exchanger in step (4), and said steam is then converted into superheated steam while being passed through the shell side of the heat exchanger in step (1).

18. The process of claim 16 wherein the effluent gas stream leaving said second heat exchange zone in step (4) is at substantially the same pressure as in the reaction zone of said gas generator less ordinary pressure drop across any solids or slag separation zone, said first and second heat exchange zones, and in the lines.

19. The process of claim 16 wherein the reaction zone in said gas generator, and said first and second heat exchange zones are located in three separate vessels.

20. The process of claim 16 wherein said first and second heat exchange zones are contained within a common shell.

21. In the process of producing gaseous mixtures comprising $H_2$, CO and containing at least one member of the group $H_2O$, $CO_2$, $H_2S$, COS, $CH_4$, $N_2$, $A_r$, and particulate carbon, by the partial oxidation of a hydrocarbonaceous fuel, a liquid oxygenated hydrocarbonaceous fuel, or a slurry of solid carbonaceous fuel and water or a liquid hydrocarbonaceous fuel with a free-oxygen containing gas, and optionally in the presence of a temperature moderator, at a temperature in the range of about 1500° to 3500° F. and a pressure in the range of about 1 to 250 atmospheres absolute in the reaction zone of a free-flow noncatalytic gas generator the improvement comprising: (1) continuously passing the hot effluent gas stream leaving the reaction zone of said gas generator through a first heat exchange zone comprising a shell and tube heat exchanger in heat exchange with a continuous stream of gaseous heat transfer fluid from step (6) thereby cooling said hot effluent gas stream while simultaneously heating said gaseous heat transfer fluid; (2) continuously bleeding a portion of said gaseous heat transfer fluid into said hot stream of effluent gas in (1) by way of openings in the walls of said tubes, while placing a sheath of gaseous heat transfer fluid between the surface of said tubes and said stream of effluent gas; (3) cleaning the mixture of effluent gas and said bleedstream portion of gaseous heat transfer fluid in a gas cleaning zone, thereby producing a clean effluent product gas; (4) introducing the stream of heated gaseous heat transfer fluid leaving said first heat exchange zone in (1) into a third heat exchange zone in indirect heat exchange with a stream of steam thereby cooling said gaseous heat transfer fluid and producing a stream of superheated steam; (5) mixing a portion of the clean effluent product gas stream from the cleaning zone in (3) with said cooled gaseous heat transfer fluid leaving said third heat exchange zone in (4); and (6) introducing said gas mixture from (5) into the first heat exchange zone in (1) as said gaseous heat transfer fluid, and at a higher pressure than said hot effluent gas stream.

22. The process of claim 21 wherein at least a portion of the superheated steam from step (4) is introduced as the working fluid into a steam turbine for producing mechanical work or electrical energy.

23. The process of claim 21 wherein the pressure of the effluent product gas stream leaving the cleaning zone in step (3) is substantially the same as that in the reaction zone of the gas generator less ordinary pressure drop in the lines plus said first and second heat exchange zones and any solids or slag separation zone.

24. The process of claim 21 provided with the additional steps of obtaining hydrogen from the clean effluent product gas from step (3) by water-gas shift, and purifying; and using at least a portion of said hydrogen in the subject process as said heat transfer fluid.

25. The process of claim 21 wherein at least a portion of the superheated steam from step (4) is introduced as the working fluid into a steam turbine for producing mechanical work or electrical energy.

26. The process of claim 21 wherein at least a portion of the superheated steam from step (4) is introduced into the reaction zone of said gas generator.

27. The process of claim 21 wherein at least a portion of said superheated steam from step (4) is used as a carrier for said hydrocarbonaceous fuel feed to the gas generator.

28. The process of claim 21 wherein at least a portion of the superheated steam from step (4) is used as the working fluid in a steam turbine used to compress air feed to an air separation unit thereby producing oxygen (95 mole % or more) for reacting in said gas generator.

29. The process of claim 21 provided with the additional step of removing at least a portion of unwanted solid matter from the group particulate carbon, ash, slag, scale, refractory, and mixtures thereof entrained in the effluent gas stream leaving the gas generator or flowing from the gas generator prior to introducing said gas stream into said first heat exchange zone.

30. The process of claim 21 wherein the free-oxygen containing gas is selected from the group consisting of air, oxygen-enriched air (more than 21 mole % $O_2$) and substantially pure oxygen (more than 95 mole % $O_2$).

31. The process of claim 21 wherein said hydrocarbonaceous fuel is a liquid hydrocarbon selected from the group consisting of liquefied petroleum gas, petroleum distillates and residues, gasoline, naphtha, kerosine, crude petroleum, asphalt, gas oil, residual oil, tar-sand oil, shale oil, coal derived oil, aromatic hydrocarbons such as benzene, toluene, xylene fraction, coal tar, cycle gas oil from fluid-catalytic-cracking operation, furfural extract of coker gas oil, and mixtures thereof.

32. The process of claim 21 wherein said hydrocarbonaceous fuel is a gaseous hydrocarbon.

33. The process of claim 21 wherein said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

34. The process of claim 21 wherein said hydrocarbonaceous fuel is a pumpable slurry of solid carbonaceous fuel selected from the group consisting of coal, lignite, particulate carbon, petroleum coke, and concentrated sewer sludge and mixtures thereof, in a carrier such as water, liquid hydrocarbon and mixtures thereof.

35. The process of claim 21 provided with the additional steps of (7) continuously passing the mixture of effluent gas and said bleedstream portion of gaseous heat transfer fluid from step (2) directly through a second heat exchange zone prior to step (3) in indirect heat exchange with a continuous stream of water, thereby converting said water into a stream of steam, while simultaneously reducing the temperature of the mixture of effluent gas and bleedstream portion of gaseous heat transfer fluid; and (8) introducing at least a portion of the steam produced in said second heat exchange zone into said third heat exchange zone in step (4) as said stream of steam.

36. The process of claim 35 wherein said water in said second heat exchange zone in step (7) is converted into steam at a temperature in the range of about 298° to 705° F. while simultaneously reducing the temperature of said effluent gas stream to a value in the range of about 300° to 700° F., and said steam in said third heat exchange zone is converted into superheated steam at a temperature in the range of about 750° to 1100° F. by cooling said heat transfer fluid to a temperature in the range of about 500° to about 2500° F.

37. The process of claim 35 wherein said first, second, and third heat exchange zones are shell and tube type heat exchangers, and the effluent gas stream from said gas generator is passed through the tubes of said first and second heat exchangers in steps (1) and (7), while simultaneously said stream of water in step (7) is converted into a stream of steam while being passed through the shell side of said second heat exchanger in step (7), and said gaseous heat transfer fluid is heated while being passed through the shell side of the first heat exchanger in step (1).

38. The process of claim 35 wherein the steam produced in step (7) is passed through the tubes of the third heat exchanger in step (4) and converted therein into superheated steam, while simultaneously said gaseous heat transfer fluid is cooled by being passed through the shell side of said third heat exchange zone.

39. The process of claim 35 wherein the pressure of the steam produced in step (7) and the pressure of the superheated steam produced in step (4) are each greater than the pressure in the reaction zone of the gas generator.

40. The process of claim 35 wherein said first and second heat exchange zones comprise two separate shell and tube heat exchangers with the tubes of the first heat exchanger being connected in series to the tubes of the second heat exchanger.

41. The process of claim 35 wherein the reaction zone in said gas generator, and said first, second, and third heat exchange zones are located in four separate vessels.

42. The process of claim 35 further provided with the step of preheating the hydrocarbonaceous fuel to a temperature up to about 800° F. but below its cracking temperature with a portion of the steam produced in steps (4) and (7) prior to introducing said fuel into the gas generator.

43. The process of claim 15 provided with the additional steps of introducing at least a portion of the clean and optionally purified gas stream into the combustor of a gas turbine, and introducing the gaseous products of combustion from said combustor into an expansion turbine for producing power.

44. The process of claim 21 provided with the additional step of purifying the clean effluent product gas from step (3) prior to mixing with said cooled gaseous heat transfer fluid in step (5).

45. The process of claim 21 provided with the additional steps of introducing at least a portion of the clean effluent product gas from step (3) into the combustor of a gas turbine, and introducing the gaseous products of combustion from said combustor into an expansion turbine for producing power.

46. The process of claim 35 provided with the additional steps of introducing at least a portion of the clean effluent product gas from step (3) into the combustor of a gas turbine, and introducing the gaseous products of combustion from said combustor into an expansion turbine for producing power.

* * * * *